US008471683B2

(12) United States Patent
Roesner

(10) Patent No.: US 8,471,683 B2
(45) Date of Patent: Jun. 25, 2013

(54) MULTILANE VEHICLE TRACKING SYSTEM

(75) Inventor: Bruce B. Roesner, Durham, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 404 days.

(21) Appl. No.: 12/797,425

(22) Filed: Jun. 9, 2010

(65) Prior Publication Data

US 2011/0304441 A1 Dec. 15, 2011

(51) Int. Cl.
*H04Q 5/22* (2006.01)
*G08B 13/14* (2006.01)
*G08G 1/01* (2006.01)

(52) U.S. Cl.
USPC ..... 340/10.4; 340/10.1; 340/10.3; 340/572.1; 340/928; 340/933

(58) Field of Classification Search
USPC .................. 340/10.1, 10.2, 10.3, 10.4, 10.42, 340/12.51, 928, 933; 342/373, 457; 455/20, 455/2, 41.2; 235/384
See application file for complete search history.

(56) References Cited

U.S. PATENT DOCUMENTS

| | | | | |
|---|---|---|---|---|
| 5,227,803 | A | 7/1993 | O'Connor et al. | |
| 6,025,799 | A * | 2/2000 | Ho et al. | 342/374 |
| 7,385,525 | B2 * | 6/2008 | Ho et al. | 340/928 |
| 7,813,699 | B2 * | 10/2010 | Ho et al. | 455/41.2 |
| 2006/0071816 | A1 | 4/2006 | Tang et al. | |
| 2006/0255968 | A1 | 11/2006 | Woo et al. | |
| 2007/0008184 | A1 | 1/2007 | Ho et al. | |
| 2008/0278347 | A1 * | 11/2008 | Ho et al. | 340/928 |

FOREIGN PATENT DOCUMENTS

WO WO 01/13338 A1 2/2001

OTHER PUBLICATIONS

International Search Report and Written Opinion mailed Jul. 6, 2011.
ID*entity* ELP, "ID*entity* External License Plate Transponder—Ultra High Frequency 865-928 MHz, Global Passive Transponder," Sirit Inc., 2 Pages, Undated, © 2009, available at least as of Jun. 9, 2010.
ID*entity* HMT-NT, "ID*entity* Headlamp Mount Tag, Non-Transferrable—Ultra High Frequency 865-928 MHz, Global Passive Transponder," Sirit Inc., 2 Pages, Undated, © 2009, available at least as of Jun. 9, 2010.
ID*entity* WMT-NT, "ID*entity* Windshield Mount Tag, Non-Transferrable—Ultra High Frequency 865-928 MHz, Global Passive Transponder," Sirit Inc., 2 Pages, Undated, © 2009, available at least as of Jun. 9, 2010.
ID*entity* WMT-TR, "ID*entity* Windshield Mount Tag, Transferrable—Ultra High Frequency 865-928 MHz, Global Passive Transponder," Sirit Inc., 2 Pages, Undated, © 2009, available at least as of Jun. 9, 2010.
ID*entity* 5200\5204, "ID*entity* 5200/5204," Sirit Inc., 2 Pages, Undated, © 2010, available at least as of Jun. 9, 2010.
ID*entity* CCT, "ID*entity* Card Tag—Ultra High Frequency 865-928 MHz, Global Passive Transponder," Sirit Inc., 2 Pages, Undated, © 2009, available at least as of Jun. 9, 2010.

* cited by examiner

*Primary Examiner* — Daniel Wu
*Assistant Examiner* — Mancil Littlejohn, Jr.

(57) ABSTRACT

A vehicle tracking system and method of tracking vehicles in multiple traffic lanes is disclosed. One system includes an RFID reader including a plurality of antenna ports. The system also includes a first antenna connected to a first antenna port of the plurality of antenna ports, the first antenna oriented toward a first lane of traffic. The system further includes a second antenna connected to the first antenna port and oriented toward a second lane of traffic. The system also includes a third antenna connected to a second antenna port of the plurality of antenna ports, the third antenna oriented toward the first lane of traffic. In some cases, the RFID reader is configured to detect the existence of a vehicle in a lane based on detection of an RFID device associated with the vehicle at two or more of the plurality of antenna ports.

16 Claims, 13 Drawing Sheets

MULTILANE VEHICLE TRACKING SYSTEM

BACKGROUND

Radio-frequency identification (RFID) based toll collection systems typically use a single reader and associated antenna per lane of traffic. In such arrangements, an antenna is oriented such that its field of transmission and reception is aimed toward a lane of traffic, for example a road lane. The antenna associated with each lane of traffic is directed toward that lane and limited so that the field covered by that antenna does not overlap into neighboring lanes.

For example, in FIG. 1, a schematic elevation view of a four lane traffic pattern is illustrated. In this arrangement, a single antenna (illustrated as the triangular element) is associated with each lane, typically by being placed above and oriented downward toward the lane (typically oriented slightly back "upstream" toward oncoming traffic as well). Each antenna has a dedicated RFID reader that transmits RFID read requests and receives responses on an antenna port to which each antenna is respectively connected.

When the lanes are controlled to prevent vehicles passing between lanes of a multilane road (e.g., by including barriers between lanes), this arrangement can be effective. However, tolling is increasingly performed without barriers or other controls placed between lanes. In such situations, a number of problems occur. First, coverage of the RF field generated by each antenna is limited, so tags passing between readers will have reduced read rates. Second, if antenna fields are designed to overlap, those overlapping fields must be duty-cycled to prevent the antenna fields from both being active at the same time. This is because, if two readers attempt to communicate with an RFID tag at the same time, that RFID tag can become "confused" and fail to respond appropriately to either reader. This results in the tag not being read by either reader. It has been observed that, even if two adjacent readers are synchronized, efficiency of the readers decreases by more than fifty (50) percent.

Existing attempts to address this lack of efficiency use a single RFID reader having multiple antenna ports, with one antenna associated with each port, and one antenna per lane of traffic. The single RFID reader is then tasked with ensuring that no overlapping antennas are on at the same time, typically by turning on only one antenna at a time and cycling through the antennas. However, when used with two lanes of traffic, this arrangement causes efficiency to drop to less than fifty (50) percent, and for four lanes the efficiency of the antenna arrangement is less than twenty-five (25) percent (since only one antenna would be on, associated with a single lane, at any given time). Additionally, this single reader, one antenna per lane arrangement does not provide complete coverage across all lanes of traffic. Additional antennas added to each lane (e.g., two antennas directed to a common lane and activated by a single port of a reader) do not address the complete coverage issue because standing waves and resulting nulls are formed, in which an RFID tag would not respond.

For these and other reasons, improvements are desirable.

SUMMARY

In accordance with the following disclosure, the above and other problems are addressed by the following.

In a first aspect, an object tracking system is disclosed and includes an RFID reader including a plurality of antenna ports. The object tracking system also includes a first antenna connected to a first antenna port of the plurality of antenna ports, the first antenna oriented toward a first lane, and a second antenna connected to the first antenna port and oriented toward a second lane. The object tracking system also includes a third antenna connected to a second antenna port of the plurality of antenna ports, the third antenna oriented toward the first lane.

In a second aspect, a method of detecting a vehicle in a lane of traffic includes detecting an RFID tag with one of first and second antennas connected to a first antenna port of an RFID reader, the first antenna associated with a first lane of traffic and the second antenna associated with a second lane of traffic. The method also includes detecting the RFID tag with a third antenna connected to a second antenna port of the RFID reader, the third antenna associated with one of the first and second lanes of traffic. The RFID reader is configured to determine the presence of the RFID tag within one of the first and second lanes of traffic based on receiving a response signal at the first and second antenna ports.

In a third aspect, a vehicle tracking system useable in association with a plurality of lanes of traffic is disclosed. The vehicle tracking system includes an RFID reader including a plurality of antenna ports. The system also includes a first antenna and a second antenna connected to a first antenna port of the plurality of antenna ports via a splitter. The first antenna has a field extending toward a first lane of traffic and which has minimal or no overlap into a second lane of traffic, and the second antenna has a field extending toward the second lane of traffic and which has minimal or no overlap into the first lane of traffic. The system also includes a third antenna and a fourth antenna connected to a second antenna port of the plurality of antenna ports via a splitter. The third antenna has a field extending toward the first lane of traffic and which has minimal or no overlap into the second lane of traffic, and the fourth antenna has a field extending toward a third lane of traffic and which has minimal or no overlap into the first or second lanes of traffic. The system also includes a fifth antenna and a sixth antenna connected to a third antenna port of the plurality of antenna ports via a splitter. The fifth antenna has a field extending toward the second lane of traffic and which has minimal or no overlap into the first or third lanes of traffic, and the sixth antenna has a field extending toward a fourth lane of traffic and which has minimal or no overlap into the first, second, or third lanes of traffic. The system further includes a seventh antenna and an eighth antenna connected to a fourth antenna port of the plurality of antenna ports via a splitter. The seventh antenna has a field extending toward the fourth lane of traffic and which has minimal or no overlap into the first, second, or third lanes of traffic, and the eighth antenna having a field extending toward a third lane of traffic and which has minimal or no overlap into the first, second, or fourth lanes of traffic. The RFID reader is configured to detect the existence of a vehicle in a lane based on detection of an RFID device associated with the vehicle at two or more of the plurality of antenna ports.

DETAILED DESCRIPTION

Figure 1:
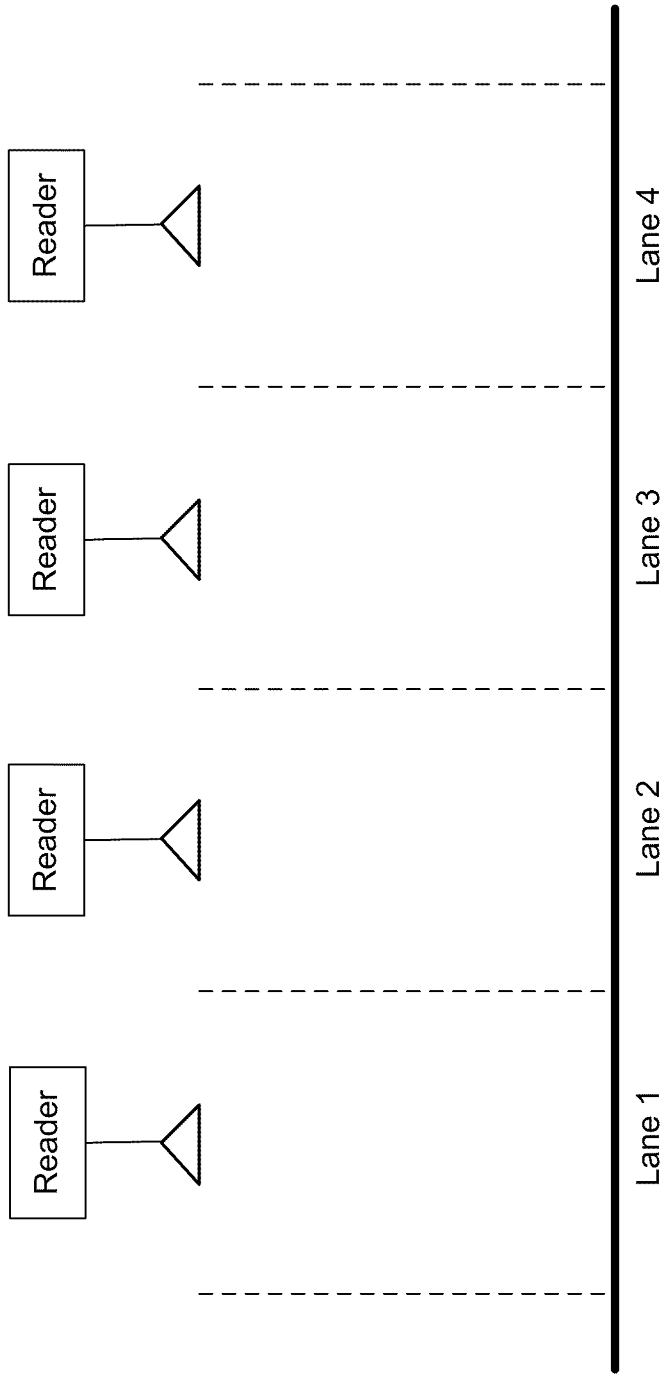
FIG. 1 (Prior Art)
FIG. 1 illustrates a prior art arrangement for detecting traffic in a multilane arrangement.

Various embodiments of the present disclosure will be described in detail with reference to the drawings, wherein like reference numerals represent like parts and assemblies throughout the several views. Reference to various embodiments does not limit the scope of the disclosure. Additionally, any examples set forth in this specification are not intended to be limiting and merely set forth some of the many possible embodiments for the present disclosure.

In general, the present disclosure relates to a multilane vehicle tracking system, and methods of use and operation of such a system. Although the examples provided herein are described with respect to the tolling of vehicles, the principles can be used to track any object passing through a portal including multiple lanes, such as objects moving through a warehouse as part of a supply chain management system.

The systems and methods of the present disclosure provide improved efficiency in detecting traffic, particularly in an uncontrolled multilane traffic environment. By “uncontrolled,” it is intended that traffic is not physically prevented from changing lanes within a region including the tracking system, such as by physical barriers between lanes or other methods.

The systems and methods relate to use of a radio frequency identification tag reader, or RFID reader, that has more than one antenna port for radiofrequency (RF) communication and has at least two antennas connected to one or more of the antenna ports. By selectively associating antennas sharing an antenna port with different traffic lanes, it is possible to detect a particular lane in which an RFID tag and associated vehicle exists based on a combination of responses from that RFID tag received at antenna ports of the RFID reader.

This arrangement can improve the efficiency of the overall system. For example, in a four lane arrangement such as disclosed herein, the systems and methods described herein operate at approximately fifty (50) percent efficiency.

Figure 2:
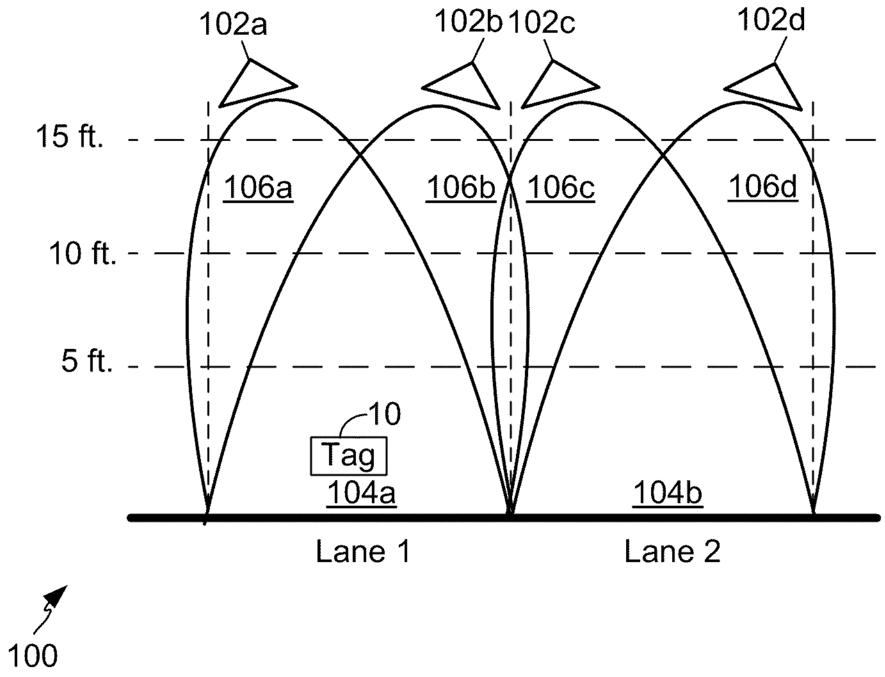
FIG. 2 is a schematic elevation view of a two lane vehicle tracking system.
Figure 3:
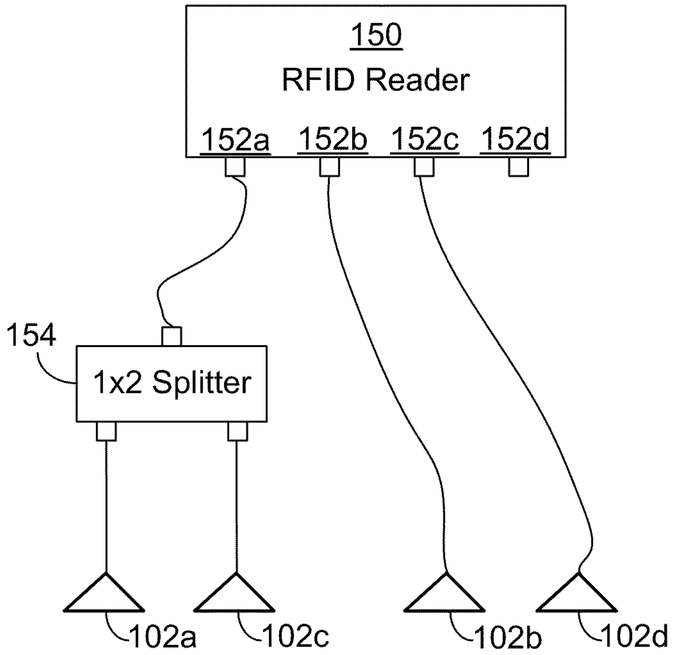
FIG. 3 is a schematic diagram of components of the vehicle tracking system of FIG. 2.

Referring now to FIGS. 2 and 3, a possible configuration for a two lane vehicle tracking system 100 is described.

FIG. 2 illustrates a schematic elevation view of the two lane vehicle tracking system 100. In the embodiment shown, the system 100 includes a plurality of antennas 102*a-d*, with two antennas associated with each lane of a multilane traffic pattern. In the embodiment shown, antennas 102*a-b* are associated with a first traffic lane 104*a,* and antennas 102*c-d* are associated with a second traffic lane 104*b*. The first traffic lane 104*a* is adjacent to the second traffic lane 104*b*.

In the embodiment shown, the antennas 102*a-d* are directional antennas, and, as such, can be placed on an arrangement oriented toward a lane of traffic with which they are associated. The antennas 102*a-d* are preferably positioned above a traffic lane and oriented both downward toward the traffic lane (as illustrated) and slightly “upstream” toward oncoming traffic. In the embodiment shown, the antennas 102*a-d* are placed approximately 17 feet above the lane surface (height illustrated by horizontal dashed lines); however, other heights could be used as well.

As illustrated, each antenna 102*a-d* has an associated field 106*a-d*, respectively, which represents the area in which that associated antenna can communicate to an RFID tag and receives a response. Each antenna 102*a-d* is positioned and oriented to have a field covering a single lane and has minimal or no overlap into an adjacent lane to prevent standing waves or RFID tag collision events (e.g., when an RFID tag attempts to respond to two or more read requests from two antennas at the same time). However, other embodiments are possible as well. Furthermore, although in the embodiment shown two antennas are associated with each traffic lane, it is understood that this arrangement is a matter of design choice; more antennas can be associated with one of more lanes of the multilane traffic pattern consistent with the present disclosure.

FIG. 3 is a schematic diagram of components of the vehicle tracking system 100 of FIG. 2. In the embodiment shown, an RFID reader 150 has a plurality of antenna ports 152*a-d*. The antenna ports 152*a-d* can be any of a number of types of radio frequency (RF) connections, such as coaxial or other wire. The antenna ports 152*a-d* can be connected to antennas, such as antennas 102*a-d*, for RF communication as directed by the RFID reader.

In the embodiment shown, three antenna ports 152*a-c* are utilized for a two-lane vehicle tracking system. A first antenna port 152*a* is connected to a splitter 154, which in turn connects to antennas 102*a* and 102*c*. The splitter is illustrated as a 1×2 radio frequency splitter capable of dividing the signal received from the antenna port 152*a*. Antenna ports 152*b* and 152*c* connect to antennas 102*b* and 102*d*, respectively.

In use, and as further described below with respect to the four-lane arrangement illustrated in FIGS. 6-8, the RFID reader 350 can be configured to cyclically activate each of its antenna ports 352*a-d*, one at a time, to transmit an RFID read request on each port and await a response. Based on the combination and connection of antennas illustrated in FIG. 3, an RFID tag (e.g. RFID tag 10) passing through the first traffic lane 304*a* of FIG. 2 will receive signals from antennas 302*a* and 302*b* as those antennas are cyclically activated to transmit RFID read requests and receive response signals from any tags present.

The signals from any RFID tag will be received at antenna ports 152*a* and 152*b* based on the connection of antennas illustrated in FIGS. 2 and 3. Based on the fact that these antenna ports detected the RFID tag 10, the RFID reader can conclude that the RFID tag is in the first traffic lane 104*a*. Similarly, an RFID tag passing through the second traffic lane 104*b* will receive read request signals and will be detected by cyclically activated antennas 102*c* and 102*d*, which are connected to antenna ports 152*a* and 152*c,* respectively. The RFID reader 150 can therefore conclude that the RFID tag is in the second traffic lane 104*b* based on the responses at antenna ports 152*a* and 152*c* identifying a common RFID tag.

The RFID reader 150 can be any of a number of RFID reader devices having a plurality of antenna ports and capable of deducing the presence of an RFID tag based on a combination of responses received from multiple antennas in a lane. In certain embodiments, the RFID reader can be a four port RFID reader, such as the IDentity™ 5204 AVI reader manufactured by Sirit, Inc. of Toronto, Ontario. Other RFID readers can be used as well.

In addition to being able to track an RFID tag within a lane, the RFID reader 150 can be configured to perform a number of tasks, such as detecting the position of the RFID tag within the lane. Additional details regarding operation of an RFID reader in connection with the various embodiments described herein are provided below in connection with FIGS. 9 and 10.

Although the cycle time of an RFID reader 150 will vary based on the capabilities of the selected RFID reader, in certain embodiments, the cycle time (time at which a single port is active) for the RFID reader can be approximately 5-30 milliseconds. This would allow detection of traffic at speeds up to 140 miles per hour. The ability to detect RFID tags passing through the antenna fields 106*a-d* is useful in uncontrolled multilane highway installations where high rates of traffic speed can be expected. In alternative embodiments, a slower or faster cycle time could be used, depending upon the selected reader and expected speed of traffic.

In the embodiment shown FIGS. 2 and 3, each pair of antennas connected to the same antenna port (e.g., antennas 102*a* and 102*c* connected to antenna port 152*a*) of the RFID reader 150 are associated with different lanes of traffic, allowing the RFID reader to interrogate multiple traffic lanes concurrently.

Figure 4:
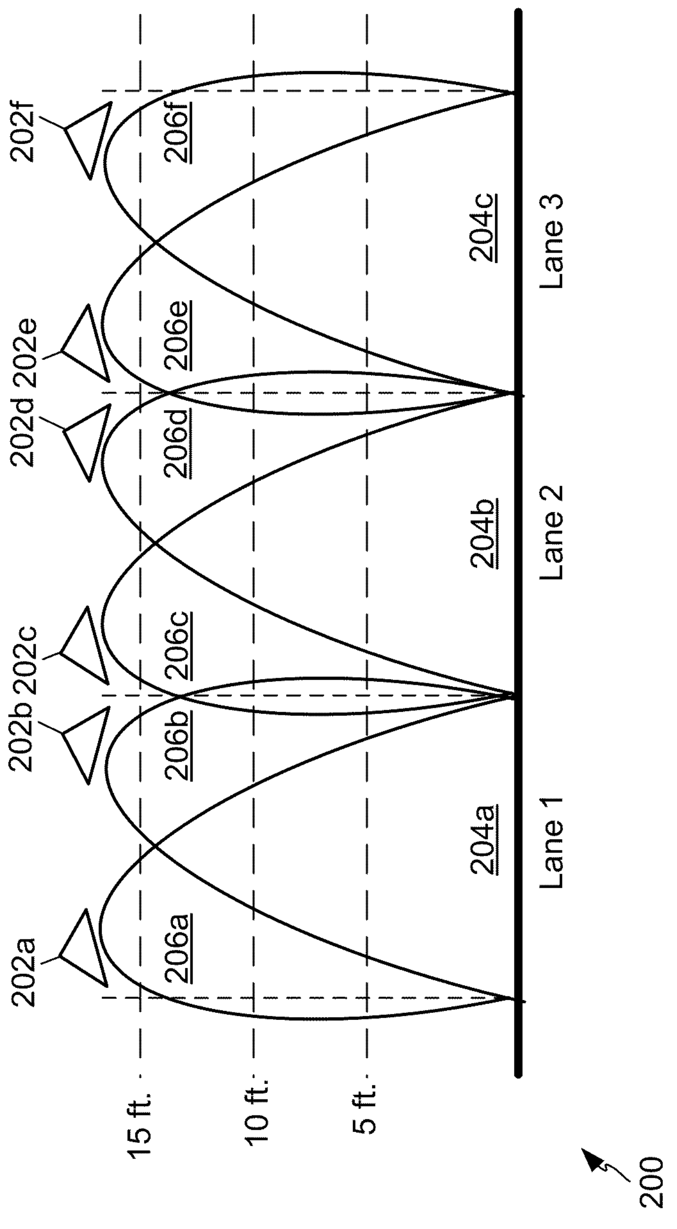
FIG. 4 is a schematic elevation view of a three lane vehicle tracking system.
Figure 5:
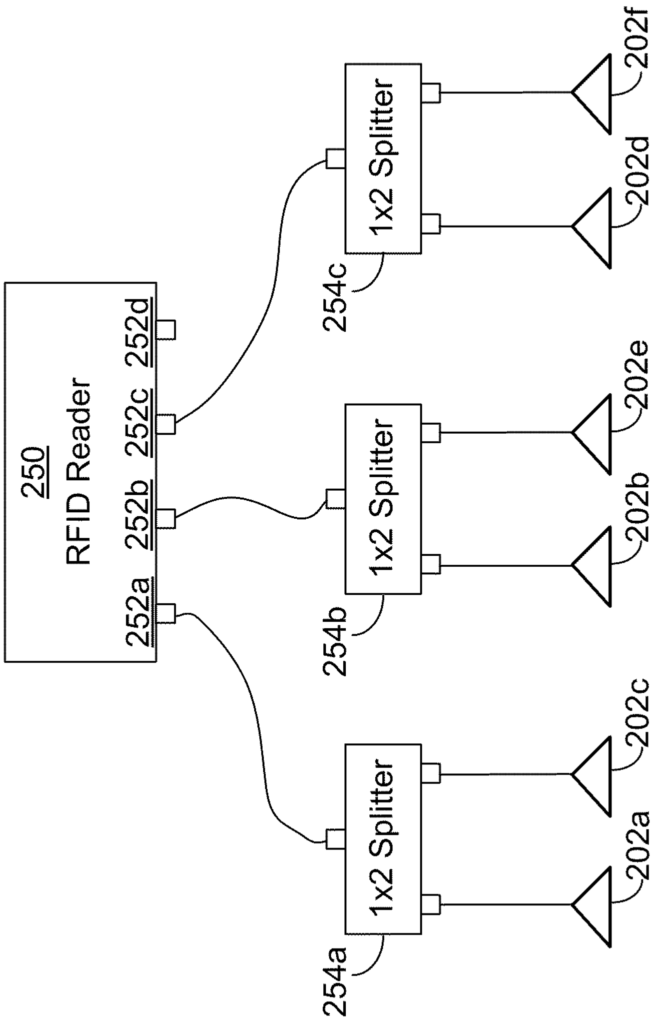
FIG. 5 is a schematic diagram of components of the vehicle tracking system of FIG. 4.

Referring now to FIGS. 4 and 5, a possible configuration for a three lane vehicle tracking system 200 is described.

FIG. 4 is a schematic elevation view of the three lane vehicle tracking system 200. In the embodiment shown, the system 200 includes a plurality of antennas 202*a-f*, with two antennas associated with each lane of a multilane traffic pattern, as described above in connection with FIG. 2. As illustrated, antennas 202*a-b* are associated with a first traffic lane 204*a*, antennas 202*c-d* are associated with a second traffic lane 204*b*, and antennas 202*e-f* are associated with a third traffic lane 204*c*. Each antenna 202*a-f* has an associated field 206*a-f*. As previously described, the fields 206*a-f* are preferably focused on a single lane of traffic, although in certain embodiments the fields can extend into two or more traffic lanes.

FIG. 5 is a schematic diagram of components of the vehicle tracking system 200 of FIG. 4, according to a possible embodiment. In the embodiment shown, an RFID reader 250 has a plurality of antenna ports, illustrated as antenna ports 252*a-d*. The RFID reader 250 can be, in certain embodiments, the same type of RFID reader as described above (RFID reader 150) in connection with FIG. 3, and can include analogous functionality.

In the embodiment shown, three splitters 254*a-c* are respectively connected to first, second, and third antenna ports 252*a-c*. Each splitter is communicatively connected, via an RF connection, to two antennas of the group of antennas 202*a-f*. In the embodiment shown, splitter 252*a* connects to antennas 202*a* and 202*c*; splitter 252*b* connects to antennas 202*b* and 202*e*; splitter 252*c* connects to antennas 202*d* and 202*f*. Each antenna will broadcast the RFID read request when the associated port of the RFID reader 250 is active, and any present RFID tag will therefore respond to RFID read requests from both antennas associated with the lane in which it resides, as the antenna ports are cyclically activated (as described in FIGS. 9 and 10 below).

Therefore, in this embodiment, detecting an RFID tag at the first and second antenna ports 252*a-b* means that the RFID tag is in the first traffic lane 204*a*, and has been detected by antennas 202*a* and 202*b*; detecting an RFID tag at the first and third antenna ports 252*a* and 252*c* means that the RFID tag is in the second traffic lane 204*b*, and has been detected by antennas 202*c* and 202*d*; and detecting an RFID tag at the second and third antenna ports 252*b-c* means that the RFID tag is in the third traffic lane 204*c*, and has been detected by antennas 202*e* and 202*f*.

In certain embodiments, more than two antennas can be associated with each lane of traffic; in such embodiments, additional antennas would be included. Those additional antennas could, in various embodiments, be configured to have associated antenna fields extending into one or more of the lanes of traffic, depending upon the selected implementation. In the embodiment shown, each pair of antennas connected to the same antenna port of the RFID reader 150 are associated with different lanes of traffic, allowing the RFID reader to interrogate multiple traffic lanes concurrently. This configuration is explained below in further detail in conjunction with FIGS. 8A-8D.

Figure 6:
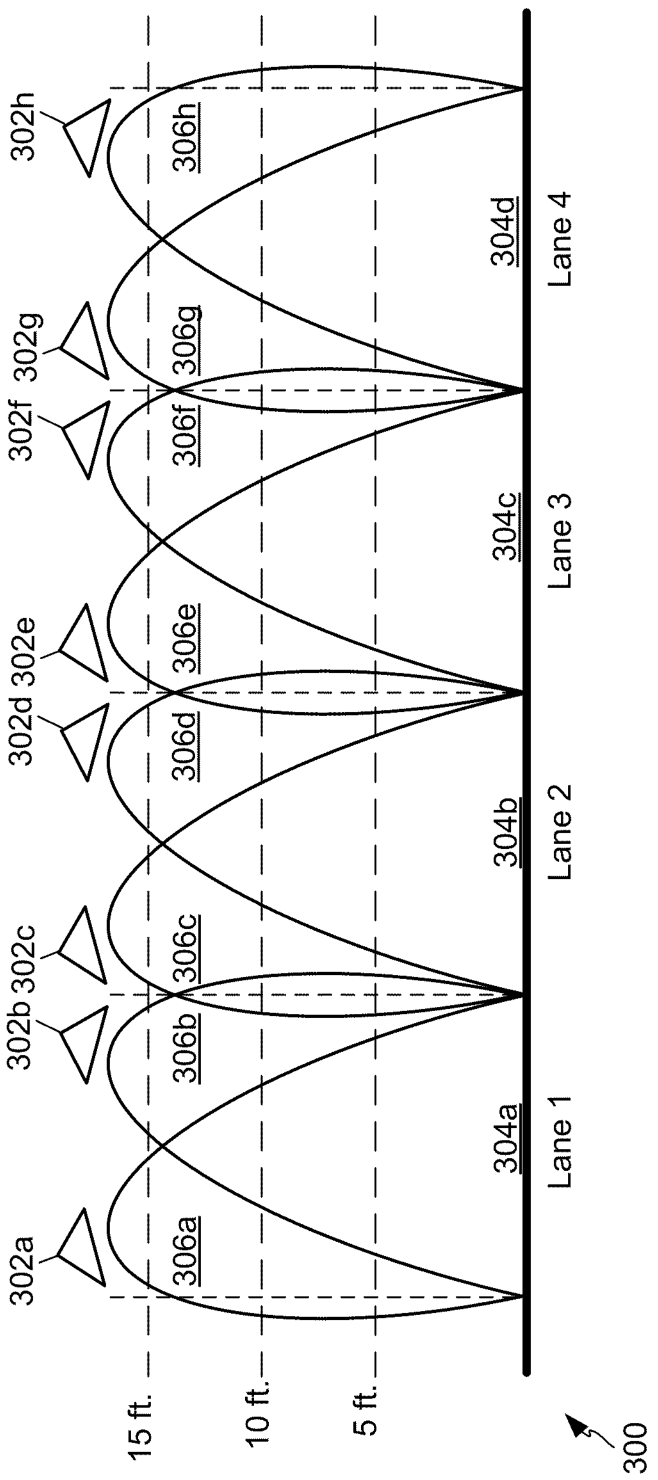
FIG. 6 is a schematic elevation view of a four lane vehicle tracking system.
Figure 7:
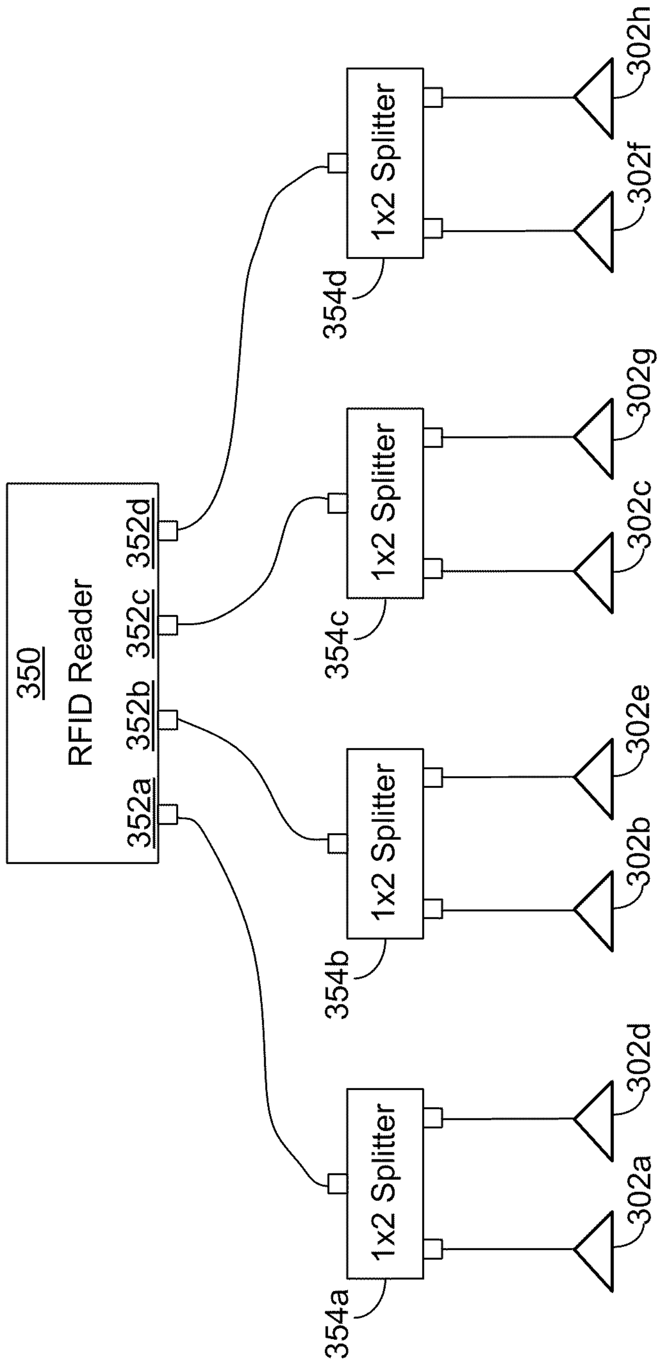
FIG. 7 is a schematic diagram of components of the vehicle tracking system of FIG. 6.

Referring now to FIGS. 6 and 7, a possible configuration for a four lane vehicle tracking system 300 is described.

FIG. 6 illustrates a schematic elevation view of the four lane vehicle tracking system 300. In the embodiment shown, eight antennas 302*a-h* are installed across four lanes of traffic 304*a-d*, with two antennas per lane of traffic. In the embodiment shown, antennas 302*a-b* are associated with a first lane of traffic 304*a*, antennas 302*c-d* are associated with a second lane of traffic 304*b*, antennas 302*e-f* are associated with a third lane of traffic 304*c*, and antennas 302*g-h* are associated with a fourth lane of traffic 304*d*. Antennas 302*a-h* have antenna fields 306*a-h*, respectively, which are directed downward and upstream toward traffic. Each of the antenna fields 306*a-h* is focused on a single lane of traffic and does not significantly overlap with fields from antennas associated with adjacent lanes. As with above-described, in alternative embodiments, more than two antennas can be associated with each lane and fields can extend outside of a single lane, for example to two or more lanes.

FIG. 7 is a schematic diagram of components of the vehicle tracking system of FIG. 6. In the embodiment shown, an RFID reader 350 has a plurality of antenna ports, illustrated as antenna ports 352*a-d*. The RFID reader 350 can be, in certain embodiments, the same type of RFID reader as described above (RFID readers 150, 250) in connection with FIGS. 3 and 5, and can include analogous functionality.

In the embodiment shown, four 1×2 splitters 354*a-d* are respectively connected to first, second, third, and fourth antenna ports 352*a-d*. Each splitter is connected to two antennas of the group of antennas 302*a-h*. In the embodiment shown, splitter 352*a* connects to antennas 302*a* and 302*d*; splitter 352*b* connects to antennas 302*b* and 302*e*; splitter 352*c* connects to antennas 302*c* and 302*g*; and splitter 352*d* connects to splitters 302*f* and 302*h*.

As with the arrangements of FIGS. 2-5, each antenna of a pair connected to the same antenna port of the RFID reader 350 is associated with a different lane of traffic, allowing the RFID reader to interrogate multiple traffic lanes concurrently, and allowing the RFID reader to deduce the lane in which an RFID tag resides based on a number of responses from that tag on different antenna ports.

In addition to the embodiments shown in FIGS. 2-7, other arrangements and combinations of antennas and antenna ports are possible as well. For example, additional antennas could be added per lane, such that three or more antennas are associated with a particular lane of traffic. Additionally, vehicle tracking systems can be provided for additional lanes of traffic as well; such systems may require use of one or more RFID readers or an RFID reader with a sufficient number of antenna ports to support at least two antennas per lane of traffic while allowing unique identification of an RFID tag within lane of traffic depending upon the antenna ports at which RFID tag's responses are received.

Example operation of the vehicle tracking system 300 of FIGS. 6 and 7 is illustrated in FIGS. 8A-8D, showing the active antenna fields 306*a-h* as the antenna ports 352*a-d* are cyclically activated.

Figure 8A:
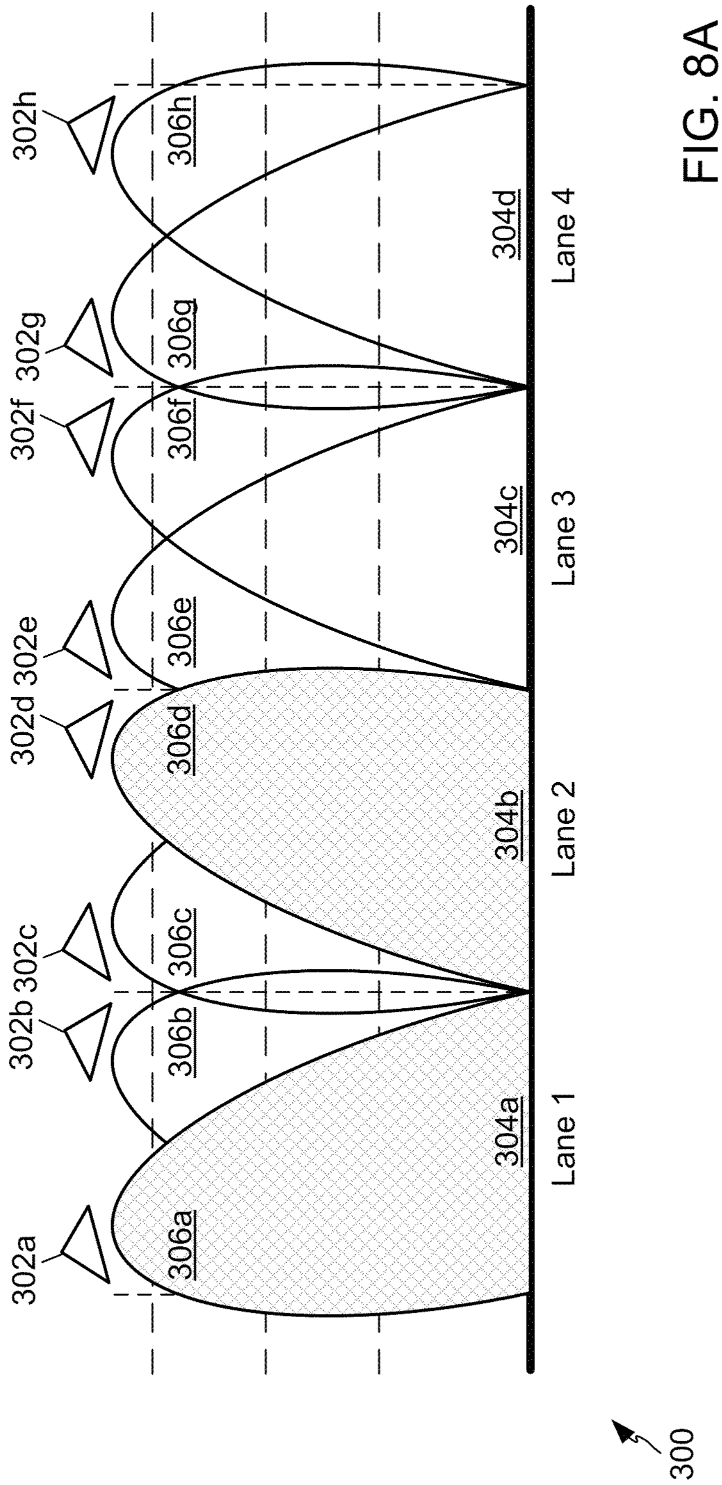
FIGS. 8A-8D illustrate operation of the four lane vehicle tracking system of FIG. 6.

In FIG. 8A, antenna port 352*a* is activated, causing RFID read requests to be broadcast by antennas 302*a* and 302*d* in first and second lanes 304*a* and 304*b* (represented by active antenna fields 306*a* and 306*d*). A response to the read request by an RFID tag as received at antenna port 352*a* would mean that the RFID tag is within either the first lane 304*a* or the second lane 304*b*.

Figure 8B:
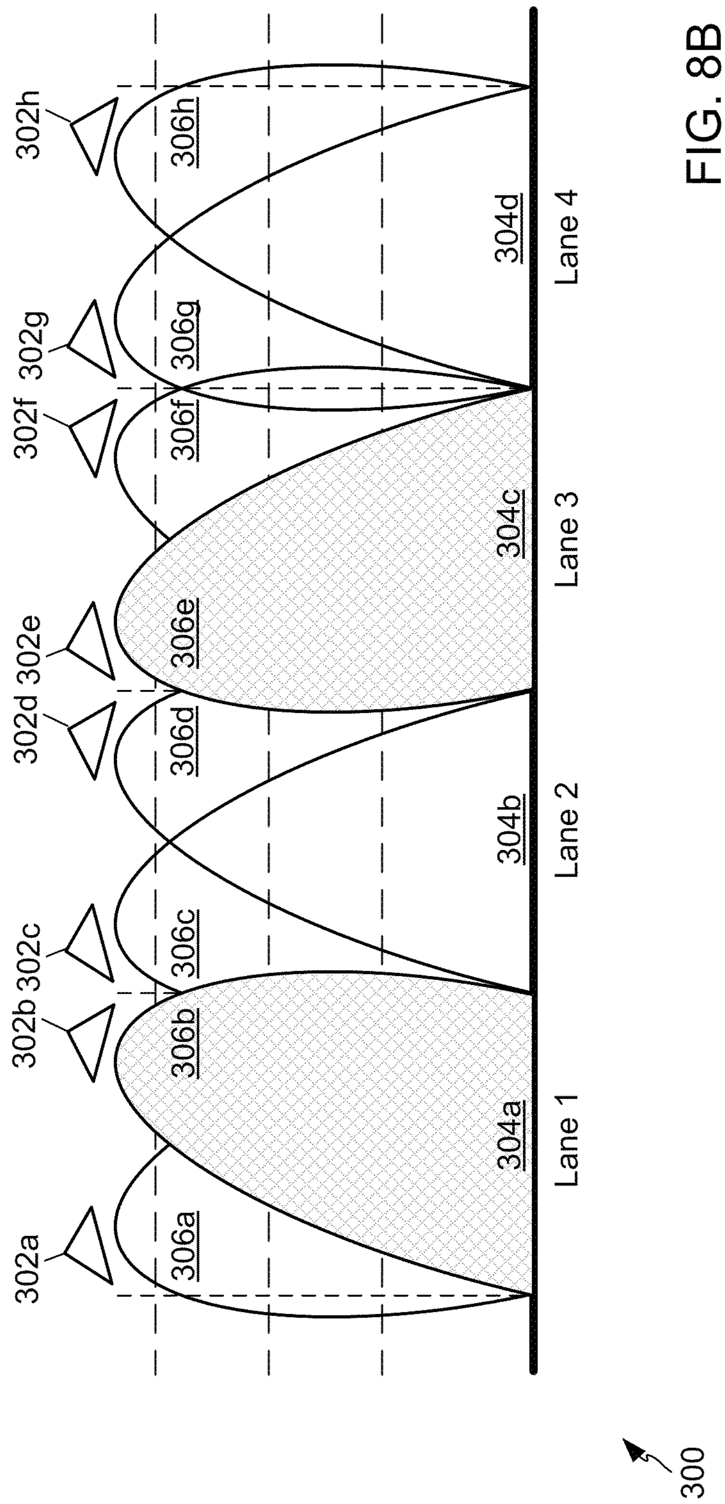

In FIG. 8B, antenna port 352*b* is active, causing RFID read requests to be broadcast by antennas 302*b* and 302*e* in first and third lanes 304*a* and 304*c* (represented by active antenna fields 306*b* and 306*e*). A response to this read request by an RFID tag as received at antenna port 352*b* would mean that the RFID tag is within either the first lane 304*a* or the third lane 304*c*.

Figure 8C:
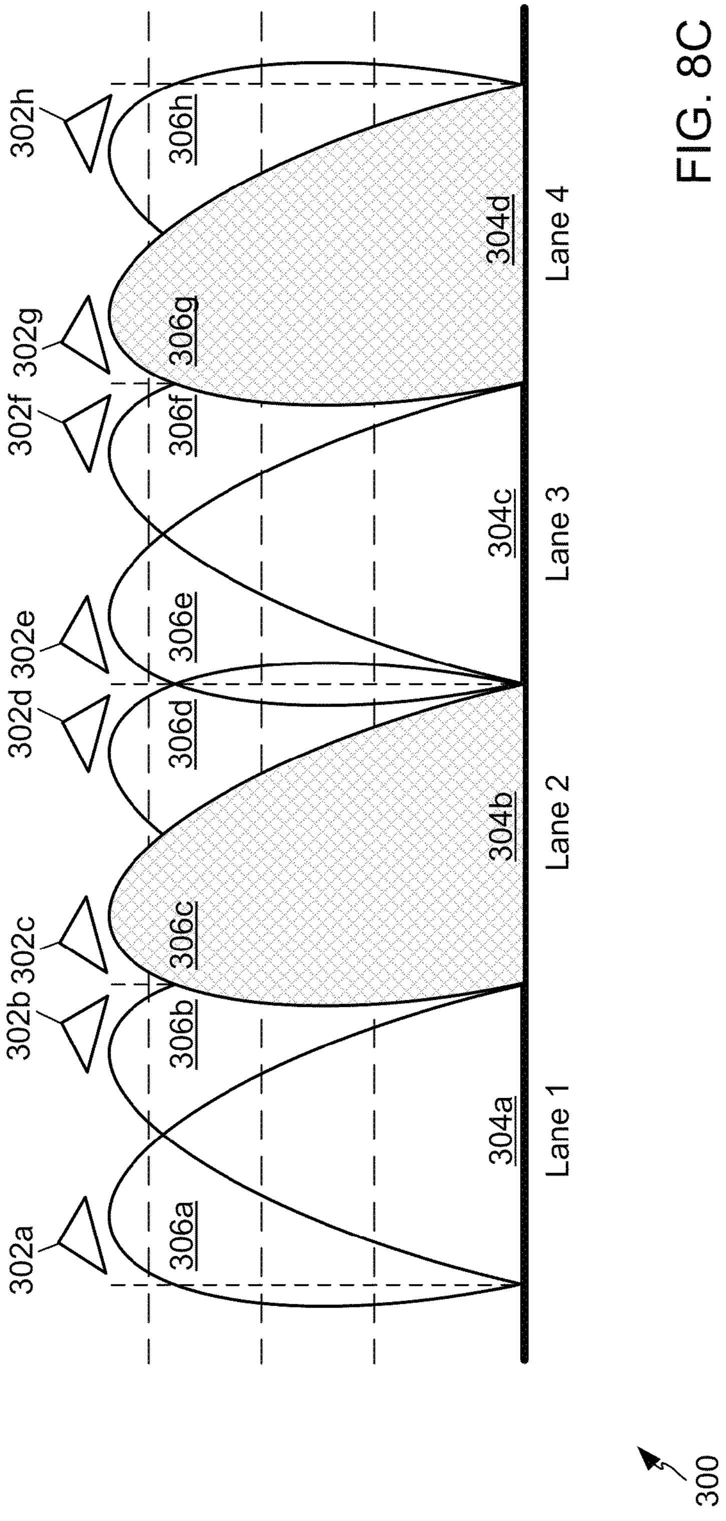

In FIG. 8C, antenna port 352*c* is active, causing RFID read requests to be broadcast by antennas 302*c* and 302*g* in second and fourth lanes 304*b* and 304*d* (represented by active antenna fields 306*c* and 306*g*). A response to this read request by an RFID tag as received at antenna port 352*c* would mean that the RFID tag is within either the second lane 304*b* or the fourth lane 304*d*.

Figure 8D:
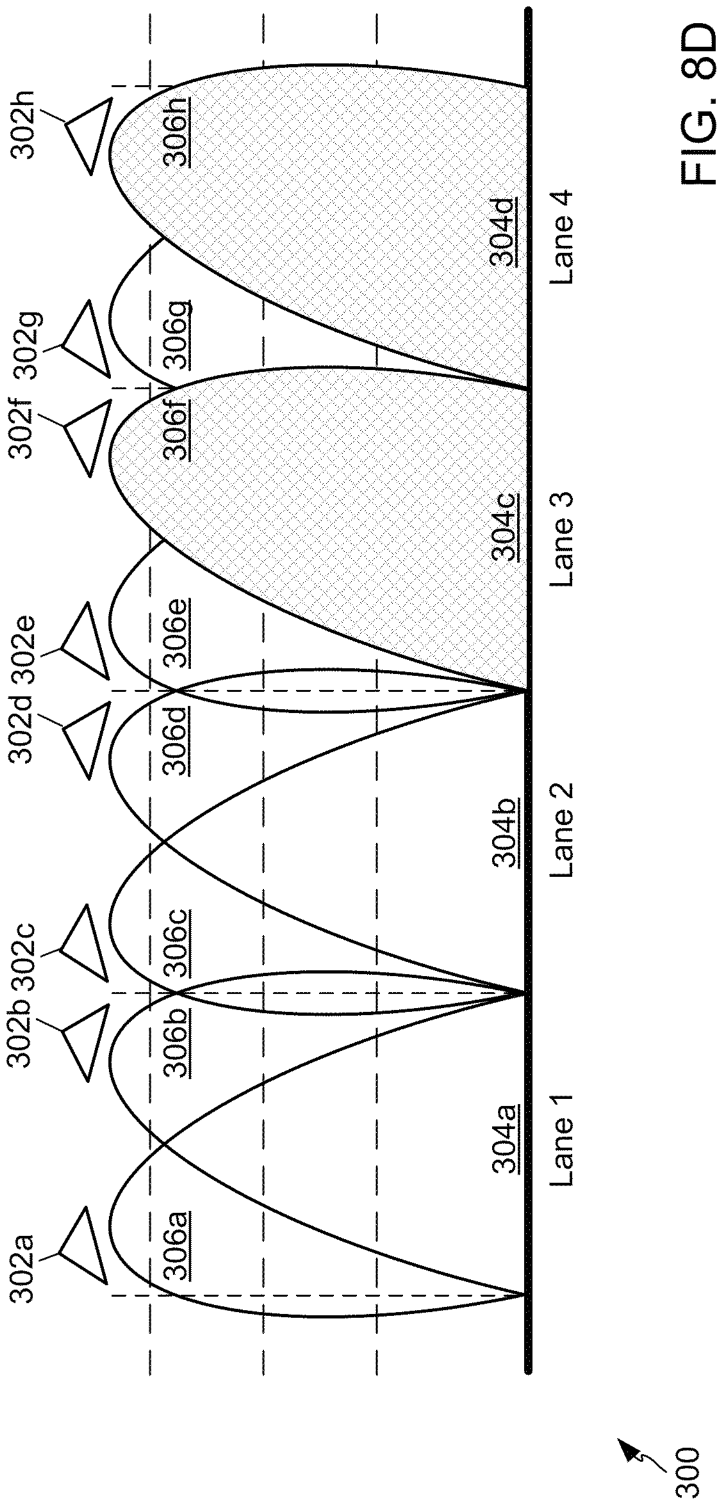

In FIG. 8D, antenna port 352*d* is active, causing RFID read requests to be broadcast by antennas 302*f* and 302*h* in third and fourth lanes 304*c* and 304*d* (represented by active antenna fields 306*f* and 306*h*). A response to this read request by an RFID tag as received at antenna port 352*d* would mean that the RFID tag is within either the third lane 304*c* or the fourth lane 304*d*.

In the embodiment shown, activation of the antenna ports 352*a-d* is allowed to occur by the RFID reader 350 such that only one antenna port is active at any given time. Although in the embodiments illustrated above the activations occur sequentially (e.g., antenna port 352*a* followed by antenna port 352*b*, etc.) other orders could be used as well. As described above, the duration for which the RFID reader 350 allows each antenna port to remain active can vary, but in certain embodiments can be approximately 5-30 milliseconds.

Responses received from any RFID tag can be stored and analyzed at the RFID reader 350, which can determine a unique lane for a given RFID tag. For example, if an RFID tag responds with its identifier to RFID read requests from first and second antenna ports 352*a* and 352*b*, it can be deduced that the RFID tag is in the first lane of traffic 304*a*. Analogous deductions occur with respect to other lanes of traffic and other RFID tags detected. Analogous sequencing to that illustrated in FIGS. 8A-8D can be implemented in arrangements having two, three, or five or more traffic lanes as well.

Figure 9:
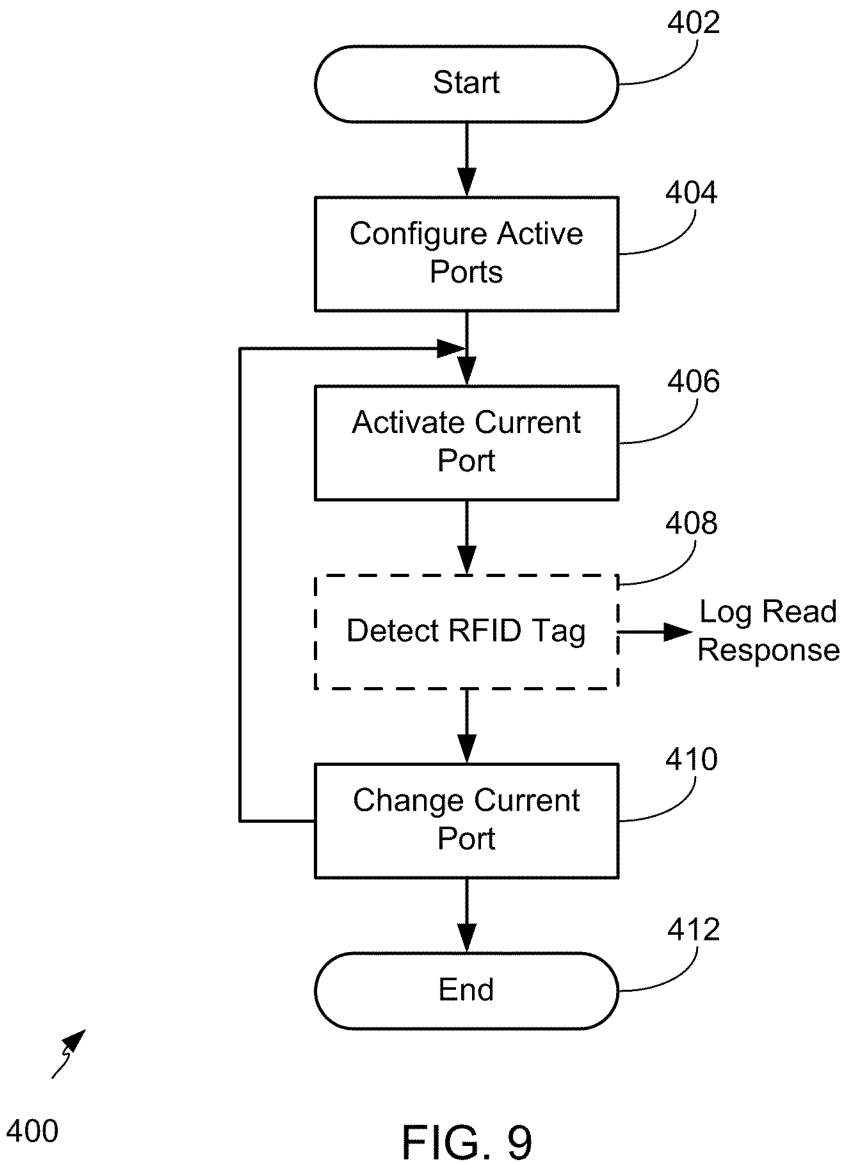
FIG. 9 is a flowchart of a method for detecting the presence of an RFID tag.
Figure 10:
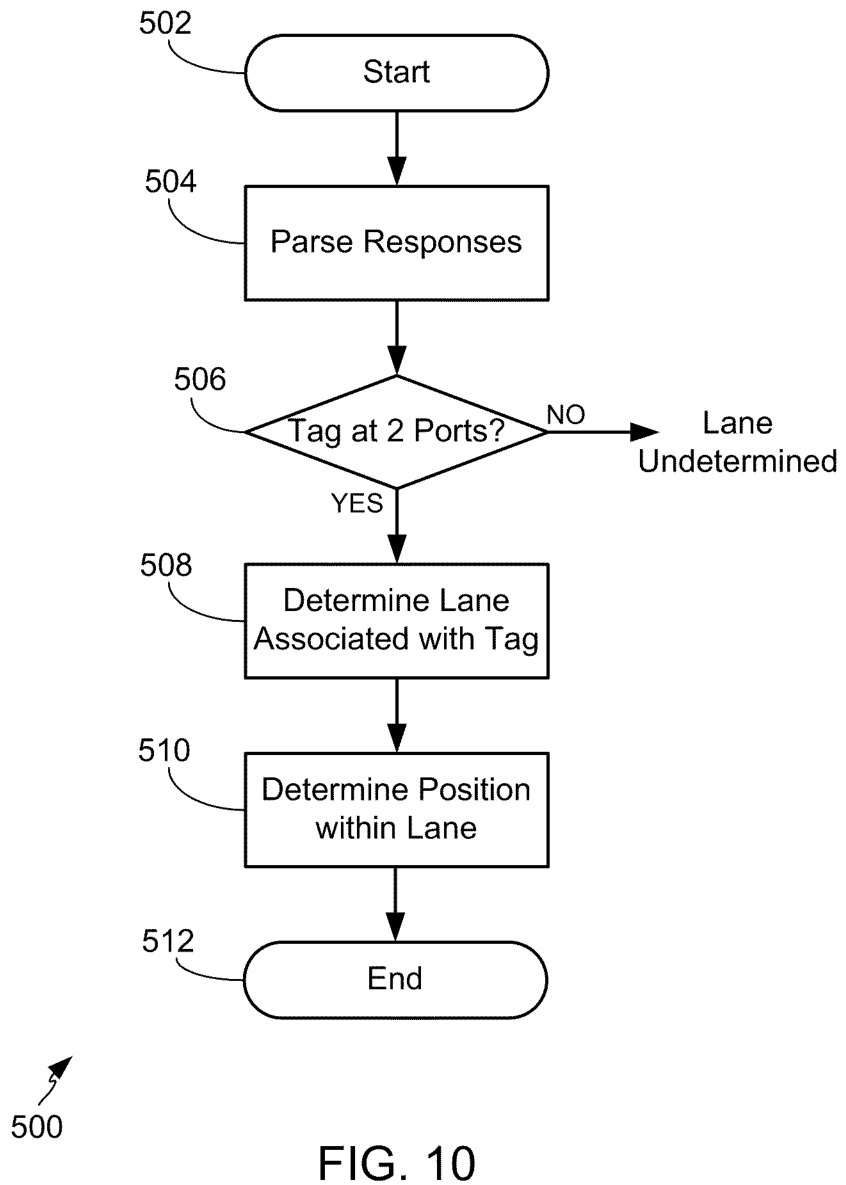
FIG. 10 is a flowchart of a method for associating an RFID tag with a lane of a multilane traffic arrangement.

Referring now to FIGS. 9 and 10, flowcharts of methods useable in the vehicle detection systems of the present disclosure are described.

FIG. 9 is a flowchart of a method 400 for detecting the presence of an RFID tag. Method 400 generally describes a process operating within an RFID reader, such as RFID readers 150, 250, 350 described above, to activate antenna ports and detect RFID tags. Certain embodiments of method 400 can be implemented in a reader to accomplish the sequence of antenna activations described above in connection with FIGS. 8A-8D, or analogous sequences.

The method 400 is instantiated at a start operation 402, which generally corresponds to initial connection of an RFID reader to a set of antennas associated with a multilane traffic pattern. A configure operation 404 corresponds to configuring one or more settings in the RFID reader. For example, in certain embodiments the RFID reader can be configurable to select a number of active antenna ports from among the total number of available antenna ports, or can be configured to adjust the cycle time between antenna ports, or the sequence/combination in which the ports are activated. Other settings can be configured as well.

An activate operation 406 activates a first antenna port of the RFID reader according to the settings defined during the configure operation 404. The activation operation 406 transmits a RFID read request to the active antenna port, and therefore to antennas connected thereto.

A response to the read request will be received at any antenna connected to the antenna port if there is an RFID tag present within a field of any antenna transmitting the RFID read request, and therefore the response will be received at the antenna port of the RFID reader. Therefore, an optional response detection operation 408 stores a received response from an RFID tag, including characteristics of the response such as an identifier of the tag and the phase angle of the response. Other characteristics of the response can be captured and stored for analysis as well.

A port change operation 410 switches the currently-active antenna port of the reader to the next port in the sequence, and will return control flow to the activate operation 406 for activating a next antenna port of the RFID reader.

Operational flow of method 400 will cycle among the activate operation 406, optional detection operation 408, and port change operation 410, causing RFID read request signals to be sent on each active antenna port of the RFID reader in cyclical sequence, the timing and order of which can be set during the configure operation 404. Upon completed operation (e.g., shutdown of the RFID reader), operation of the method 400 will halt at an end operation 412.

FIG. 10 is a flowchart of a method 500 for associating an RFID tag with a lane of a multilane traffic arrangement. The method 500 is useable, for example, with the detected RFID tag records obtained by cycling through antenna ports of an RFID reader, as described in conjunction with the method 400 of FIG. 9.

The method 500 is instantiated at a start operation 502, which corresponds to initial analysis of RFID tag responses. The start operation 502 may occur upon initial operation of an RFID reader, once the RFID reader begins receiving responses from RFID tags, or after data collection has completed. A response parsing operation 504 analyzes responses from RFID tags to determine the identity of the tag and the port at which the response is received. If a tag is detected at two different ports, a determination assignment operation 506 branches "yes" to a lane assignment operation 508. The lane assignment operation 508 can then determine the lane through which the RFID tag has passed based on the combination of antenna ports detecting the same tag.

If the tag is not detected at two different antenna ports, operational flow from the determination assignment operation 506 branches "NO" indicating that the RFID reader will not be able to uniquely determine which lane the RFID tag has passed through.

Optionally, after determining the lane through which the RFID tag has passed, it may be useful to determine the location within the lane at which the RFID tag resides. This may be useful to monitor the RFID tag's speed through the lane, or relative location within the lane. A determination operation 510 determines position of the RFID tag using a phase angle of the received response at one or more of the antenna ports receiving a response from that RFID tag.

Any of a number of known mathematical procedures can be used to perform this operation. One example method to compute and compensate for phase angle in an RFID receiver circuit of an RFID reader is to determine the relative velocity of the vehicle using the change in phase angle (Doppler affect). The relative velocity measurement at any given time on two different antennas correlates to the ratio of the angles formed from the path of the tag and antenna. Since the separation of the antennas is known, the angle ratio can then be used to calculate the position in the lane. Operational flow terminates at an end operation 512 after any information about the RFID tag is extracted and stored for further processing (e.g. charging a toll to the owner of the RFID tag, traffic logging, or other operations).

Referring to FIG. 10 generally, the method 500 can be performed with respect to a subset or all tag responses received at the RFID reader and, therefore, can be executed a number of times depending upon the number of responses received. Additional operations can also be added if more information is required of the particular RFID tag or response analyzed. For example, an estimated velocity of the vehicle associated with the particular RFID tag can also be calculated.

Overall, using the systems and methods disclosed herein, improved operational efficiency is accomplished by use of multiple antennas per lane, and by interrogating multiple lanes per operational cycle, due to connection of multiple antennas to an antenna port of a single reader. Other advantages, including consolidated processing of RFID read responses, are achieved as well.

Generally, consistent with embodiments of the disclosure, the RFID readers of the present disclosure can include one or more programmable circuits capable of executing program modules. Program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems.

Embodiments of the present disclosure can be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media. Further, the disclosed methods' stages may be modified in any manner, including by reordering stages and/or inserting or deleting stages, without departing from the overall concept of the present disclosure.

The above specification, examples and data provide a complete description of the manufacture and use of example embodiments of the present disclosure. Many embodiments of the disclosure can be made without departing from the spirit and scope of the disclosure.

What is claimed is:

1. An object tracking system comprising:

an RFID reader including a plurality of antenna ports;

a first antenna associated with a first antenna port of the plurality of antenna ports, the first antenna oriented toward a first lane;

a second antenna associated with the first antenna port and oriented toward a second lane;

a third antenna associated with a second antenna port of the plurality of antenna ports, the third antenna oriented toward the first lane; and a fourth antenna associated with the second antenna port and oriented toward the second lane;

wherein a first field associated with the first antenna overlaps a third field associated with the third antenna;

wherein a second field associated with the second antenna overlaps a fourth field associated with the fourth antenna; and wherein the RFID reader is configured to cycle activation of the antennas so that the first and second fields are active at a first time and the third and fourth fields are active at a second time that differs from the first time.

2. The object tracking system of claim 1, further comprising a splitter electrically connected between the first antenna port, and the first and second antennas.

3. The object tracking system of claim 1, wherein the first and second lanes form at least a portion of a multilane highway.

4. The object tracking system of claim 1, further comprising:

a fifth antenna associated with a third antenna port of the plurality of antenna ports, the fifth antenna oriented toward the second lane; and a sixth antenna associated with the third antenna port and oriented toward the third lane.

5. The object tracking system of claim 1, further comprising:

a fifth antenna associated with a third antenna port of the plurality of antenna ports, the fifth antenna oriented toward the second lane;

a sixth antenna associated with the third antenna port and oriented toward a fourth lane;

a seventh antenna associated with a fourth antenna port of the plurality of antenna ports, the seventh antenna oriented toward the fourth lane; and an eighth antenna associated with the fourth antenna port and oriented toward the third lane.

6. The object tracking system of claim 1, wherein the RFID reader is configured to detect an existence of a vehicle in a lane based on detection of an RFID device associated with the vehicle at two or more of the plurality of antenna ports.

7. The object tracking system of claim 1, wherein the RFID reader is configured to detect a position of a vehicle in a lane based on a phase angle of a received signal from an RFID device associated with the vehicle.

8. A method of detecting a vehicle in a lane of traffic, the method comprising:

detecting an RFID tag with one of first and second antennas associated with a first antenna port of an RFID reader, the first antenna being associated with a first lane of traffic and the second antenna associated with a second lane of traffic, and the second lane of traffic being adjacent to the first lane of traffic;

detecting the RFID tag with one of third and fourth antennas associated with a second antenna port of the RFID reader, the third antenna being associated with the first lane of traffic and the fourth antenna being associated with the second lane of traffic;

cycling activation of the antennas so that the first and second fields are active at a first time and the third and fourth fields are active at a second time that differs from the first time; and determining the presence of the RFID tag within one of the first and second lanes of traffic based on receiving a response signal at the first and second antenna ports.

9. The method of claim 8, wherein detecting the RFID tag with one of first and second antennas comprises activating the first antenna port to transmit a read signal to the first and second antennas.

10. The method of claim 9, wherein detecting the RFID tag with one of first and second antennas comprises receiving a response signal from the RFID tag at one of the first and second antennas, thereby receiving the response signal at the first antenna port.

11. The method of claim 8, further comprising:

detecting a second RFID tag with one of the first and second antennas;

detecting the second RFID tag with the fourth antenna wherein the RFID reader is configured to determine a presence of the second RFID tag within the lane associated with the fourth antenna based on receiving a response signal at the first and third antenna ports.

12. The method of claim 8, further comprising detecting a position of the RFID tag within one of the first and second lanes of traffic based on a phase angle of a response signal detected by the third antenna and received at the second antenna port.

13. The method of claim 8, wherein the first antenna has a field extending toward the first lane of traffic and which minimizes into the second lane of traffic.

14. The method of claim 13, wherein the second antenna has a field extending toward the second lane of traffic and which minimizes into the first lane of traffic.

15. A vehicle tracking system useable in association with a plurality of lanes of traffic, the vehicle tracking system comprising:

an RFID reader including a plurality of antenna ports;

a first antenna and a second antenna connected to a first antenna port of the plurality of antenna ports via a splitter;

the first antenna having a field extending toward a first lane of traffic and which does not extend into a second lane of traffic; and the second antenna having a field extending toward the second lane of traffic and which does not extend into the first lane of traffic, the second lane of traffic being adjacent to the first lane of traffic;

a third antenna and a fourth antenna connected to a second antenna port of the plurality of antenna ports via a splitter;

the third antenna having a field extending toward the first lane of traffic and which does not extend into the second lane of traffic; and the fourth antenna having a field extending toward a third lane of traffic and which does not extend into the first or second lanes of traffic, the third lane of traffic being adjacent to the second lane of traffic;

a fifth antenna and a sixth antenna connected to a third antenna port of the plurality of antenna ports via a splitter;

the fifth antenna having a field extending toward the second lane of traffic and which does not extend into the first or third lanes of traffic; and the sixth antenna having a field extending toward a fourth lane of traffic and which does not extend into the first, second, or third lanes of traffic, the fourth lane of traffic being adjacent to the third lane of traffic;

a seventh antenna and an eighth antenna connected to a fourth antenna port of the plurality of antenna ports via a splitter;

the seventh antenna having a field extending toward the fourth lane of traffic and which does not extend into the first, second, or third lanes of traffic; and the eighth antenna having a field extending toward the third lane of traffic and which does not extend into the first, second, or fourth lanes of traffic;

wherein the RFID reader is configured to detect the existence of a vehicle in a lane based on detection of an RFID device associated with the vehicle at two or more of the plurality of antenna ports.

16. The vehicle tracking system of claim 15, wherein the RFID reader is configured to detect a position of the vehicle in a lane based on a phase angle of a received signal from an RFID device associated with the vehicle.

* * * * *